(12) United States Patent
Coccia et al.

(10) Patent No.: US 11,364,934 B2
(45) Date of Patent: Jun. 21, 2022

(54) TRAINING A GENERATOR UNIT AND A DISCRIMINATOR UNIT FOR COLLISION-AWARE TRAJECTORY PREDICTION

(71) Applicant: Bayerische Motoren Werke Aktiengesellschaft, Munich (DE)

(72) Inventors: Giuseppe Coccia, Munich (DE); Tessa Heiden, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 154 days.

(21) Appl. No.: 16/801,836

(22) Filed: Feb. 26, 2020

(65) Prior Publication Data

US 2020/0283017 A1  Sep. 10, 2020

(30) Foreign Application Priority Data

Mar. 5, 2019  (EP) .................................... 19160830

(51) Int. Cl.
*B60W 60/00* (2020.01)
*G05D 1/02* (2020.01)

(52) U.S. Cl.
CPC .... *B60W 60/0011* (2020.02); *B60W 60/0025* (2020.02); *B60W 60/00272* (2020.02); *B60W 60/00274* (2020.02); *G05D 1/0289* (2013.01); *G05D 2201/0213* (2013.01)

(58) Field of Classification Search
CPC ......... B60W 60/0011; B60W 60/0025; B60W 60/00272; B60W 60/00274; B60W 30/0956; B60W 30/095; B60W 40/00; B60W 40/02; G05D 1/0289; G05D 2201/0213; G08G 1/166; G06N 3/0445; G06N 3/006; G06N 3/08; G06N 3/0454; G06N 3/04

See application file for complete search history.

(56) References Cited

FOREIGN PATENT DOCUMENTS

| CN | 108564129 A | 9/2018 |
|---|---|---|
| CN | 109318897 A | 2/2019 |
| KR | 10-1925907 B1 | 2/2019 |
| WO | WO 2018/211140 A1 | 11/2018 |

OTHER PUBLICATIONS

Sadeghian, Amir, et al. "SoPhie: An Attentive GAN for Predicting Paths Compliant to Social and Physical Constraints." arXiv preprint arXiv:1806.01482 (2018). (Year: 2018).*

(Continued)

*Primary Examiner* — James J Lee
*Assistant Examiner* — Andrew Sang Kim
(74) *Attorney, Agent, or Firm* — Crowell & Moring LLP

(57) ABSTRACT

A system trains a generator unit and a discriminator unit simultaneously. The generator unit is configured to determine a future trajectory of at least one other road user in the environment of a vehicle considering an observed trajectory of the at least one other road user. The discriminator unit is configured to determine whether the determined future trajectory of the other road user is an actual future trajectory of the other road user. The system is configured to train the generator unit and the discriminator unit simultaneously with gradient descent.

11 Claims, 2 Drawing Sheets

(56) References Cited

OTHER PUBLICATIONS

De Cao, Nicola, and Thomas Kipf. "MolGAN: An implicit generative model for small molecular graphs." arXiv preprint arXiv:1805.11973 (2018). (Year: 2018).*

Gupta, Agrim, et al. "Social gan: Socially acceptable trajectories with generative adversarial networks." Proceedings of the IEEE Conference on Computer Vision and Pattern Recognition. 2018. (Year: 2018).*

Extended European Search Report issued in European Application No. 19160830.6 dated Sep. 6, 2019 (seven (7) pages).

\* cited by examiner

TRAINING A GENERATOR UNIT AND A DISCRIMINATOR UNIT FOR COLLISION-AWARE TRAJECTORY PREDICTION

CROSS REFERENCE TO RELATED APPLICATION

This application claims priority under 35 U.S.C. § 119 from European Patent Application No. EP 19 160 830.6, filed Mar. 5, 2019, the entire disclosure of which is herein expressly incorporated by reference.

BACKGROUND AND SUMMARY OF THE INVENTION

This invention relates to a system and a method for training a generator unit and a discriminator unit for collision-aware trajectory prediction.

An automated vehicle is a vehicle with automated longitudinal guidance and/or automated lateral guidance. The term "automated vehicle" also comprises an autonomous vehicle. The term "automated vehicle" comprises in particular a vehicle with an arbitrary level of automation, for example the levels of automation that are defined in the standard SAE J3016 (SAE—Society of Automotive Engineering):

Level 0: Automated system issues warnings and may momentarily intervene but has no sustained vehicle control.

Level 1 ("hands on"): The driver and the automated system share control of the vehicle. Examples are Adaptive Cruise Control (ACC), where the driver controls steering and the automated system controls speed; and Parking Assistance, where steering is automated while speed is under manual control. The driver must be ready to retake full control at any time. Lane Keeping Assistance (LKA) Type II is a further example of level 1 self-driving.

Level 2 ("hands off"): The automated system takes full control of the vehicle (accelerating, braking, and steering). The driver must monitor the driving and be prepared to intervene immediately at any time if the automated system fails to respond properly. The shorthand "hands off" is not meant to be taken literally. In fact, contact between hand and wheel is often mandatory during SAE 2 driving, to confirm that the driver is ready to intervene.

Level 3 ("eyes off"): The driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so.

Level 4 ("mind off"): As level 3, but no driver attention is ever required for safety, i.e. the driver may safely go to sleep or leave the driver's seat. Self-driving is supported only in limited spatial areas (geofenced) or under special circumstances, like traffic jams. Outside of these areas or circumstances, the vehicle must be able to safely abort the trip, i.e. park the car, if the driver does not retake control.

Level 5 ("steering wheel optional"): No human intervention is required at all. An example would be a robotic taxi.

An automated vehicle needs to predict trajectories of other road users to determine its own future trajectory. It is however difficult to predict the trajectories of other road users accurately.

Therefore, the purpose of this invention is to improve the accuracy of predicted trajectories of other road users.

One aspect of the invention describes a system for training a generator unit and a discriminator unit simultaneously. The generator unit is configured to determine a future trajectory of at least one other road user in the environment of a vehicle, in particular an automated vehicle, considering an observed trajectory of the at least one other road user.

Determining the future trajectory of the at least one other road user means in particular that the future trajectory of the at least one other road user is predicted based on the observed trajectory of the at least one other road user.

The trajectory of the at least one other road user is the path that the at least one other road user follows through space as a function of time.

The discriminator unit is configured to determine whether the determined future trajectory of the other road user is an actual future trajectory of the at least one other road user. An actual future trajectory of the at least one other road user is in particular part of a dataset of training data. The dataset of training data can be generated by splitting actual observed trajectories of road users in two parts from which the first part is presented to the generator unit as an observed trajectory. Then either the future trajectory determined by the generator unit or the second part of the actual observed trajectory can be presented to the discriminator unit.

In other words the goal of the discriminator unit is to determine whether a trajectory that it received as input has been determined by the generator unit or is part of the dataset of training data.

The system is configured to train the generator unit and the discriminator unit simultaneously with gradient descent.

Gradient descent is a first-order iterative optimization algorithm for finding the minimum of a function. To find a local minimum of a function using gradient descent, one takes steps proportional to the negative of the gradient (or approximate gradient) of the function at the current point. If, instead, one takes steps proportional to the positive of the gradient, one approaches a local maximum of that function; the procedure is then known as gradient ascent. Gradient descent is also known as steepest descent.

In particular, a deterministic policy gradient algorithm is used, since these algorithms outperform stochastic policy gradient algorithms that require more samples. However, it is possible to use stochastic policy gradient anyway.

The approach of simultaneously training the generator unit and the discriminator unit is known generative adversarial networks (GANs).

The generator unit generates candidates (generative) and the discriminator unit evaluates them (discriminative). Typically, the generator unit learns to map from a latent space to a particular data distribution of interest, while the discriminator unit discriminates between instances from the true data distribution and candidates produced by the generator unit. The generator unit's training objective is to increase the error rate of the discriminator unit (i.e., "fool" the discriminator unit by producing novel synthesized instances that appear to have come from the true data distribution).

In practice, a known dataset serves as the initial training data for the discriminator unit. Training the discriminator unit involves presenting it with samples from the dataset, until it reaches some level of accuracy. Typically the generator unit is seeded with a randomized input that is sampled from a predefined latent space (e.g. a multivariate normal distribution). Thereafter, samples synthesized by the generator unit are evaluated by the discriminator unit.

In particular, the generator unit determines a future trajectory for at least one other road user in the environment of an automated vehicle, with a driving assistance system of the automated vehicle configured to determine a trajectory for the automated vehicle itself considering the determined future trajectory for the at least one other road user.

In a preferred embodiment of the invention, the other road user is a vulnerable road user, e.g. a pedestrian, a cyclist or an animal.

The trajectories of said vulnerable road users are more difficult to predict than trajectories of motorized road users, because said vulnerable road users move in a more dynamic way. For example, vulnerable road users are more likely to disregard traffic rules. Moreover, vulnerable road users are less bound to roadways and traffic lanes.

In a preferred embodiment of the invention the system comprises an oracle unit, with said oracle unit configured to determine a reward for the determined future trajectory of the at least one other road user considering whether the determined future trajectory of the other road user is collision-free, and with said system configured to train said generator unit considering the reward determined by the oracle unit.

The oracle unit is in particular configured to determine the reward for the determined future trajectory considering the number of collisions between the determined future trajectory and objects, for example static and/or dynamic objects.

The oracle unit is in particular used to approximate the reward function of a determined future trajectory and optimize determination of future trajectories towards non-differentiable metrics using reinforcement learning.

Dataset and generated samples are inputs of the oracle unit, but, differently from the discriminator unit, it assigns scores to them. (e.g., number of collisions of the determined future trajectory). The oracle unit learns to assign a reward to each determined future trajectory to match a score provided by an external software. The discriminator unit is then trained using the objective of discriminating between instances from the true data distribution and candidates produced by the generator unit, while the generator unit uses for example a linear combination of the objective to increase the error rate of the discriminator unit and the reward determined by the oracle unit.

In other words, the oracle unit is used to influence the generator unit such that the generator unit not only determines future trajectories that are nominally accurate with respect to the observed trajectory of the at least one other road user.

Minimizing collisions for example has the additional benefit of producing more accurate trajectories, because other road users tend to do the same, even if the observed trajectory of the at least one other road user does not give any evidence for this behavior.

While the generator unit and the discriminator unit are trained to determine plausible future trajectories, the determined future trajectories need not be safe. There exist in particular two types of collisions that are interesting in the context of future trajectory prediction. The first type are dynamic collisions between the different road users themselves. The second type are static collisions between the road users and various static environment elements through which a trajectory is physically impossible to pass. Example of static collision is future trajectories of pedestrians crossing through trees, parked cars or buildings. The oracle unit is responsible for minimizing the static and dynamic collisions in the generated future trajectories.

A natural objective for the oracle unit is a supervised loss that minimizes the number of future dynamic and static collisions. Unfortunately, integrating such an objective to the model is not straightforward. On one hand, the number of non-colliding trajectories in existing datasets is overwhelmingly higher than for colliding trajectories. Moreover, even with an abundance of colliding trajectory examples, the predicted future trajectories are random samples from the generative model: even if a trajectory is far away from the ground truth trajectory, it does not mean the trajectory is incorrect. Another learning strategy beyond supervised learning is required.

In particular, the off-policy actor-critic framework can be used to minimize collisions in future trajectories.

In an off-policy setting, an agent learns about a policy or policies different from the one it is executing. Off-policy methods have a wider range of applications and learning possibilities. Unlike on-policy methods, off-policy methods are able to, for example, learn about an optimal policy while executing an exploratory policy, learn from demonstration, and learn multiple tasks in parallel from a single sensorimotor interaction with an environment.

In the off-policy actor-critic framework we need an actor and a critic. In our model the actor is the generator unit that recasts determined future trajectories as action samples. The maximum reward is then for example attained by the generator unit when minimizing the number of generated collisions. Next, in the proposed model the critic is the oracle unit. In the end, the oracle module guides the trajectory generator to generate novel trajectories with high immediate reward, namely for example low number of trajectory collisions.

In a preferred embodiment of the invention, the generator unit is configured to determine the future trajectory of the at least one other road user considering at least one static object in the environment of the other road user.

To determine novel, accurate and safe future trajectories, the location coordinates of the at least one other road user is not enough. The location coordinates alone do not give any information regarding interactions with the static environment in the scene. It would be impossible for any model to avoid collisions with static elements without providing such scene information to the system. In particular, a simple approach can be used. For example the closest boundary points of the scene can be used.

In a preferred embodiment of the invention, the generator unit is configured to determine the future trajectory of the at least one other road user considering the relative location of the at least one static object. The relative location of the at least one static object is in particular encoded in a grid in polar angle space, wherein the encoded value per grid cell is the minimum distance to the pedestrians that lie within the cone of the angular grid cell.

Compared to a standard 2D grid, the resolution of the grid in polar angle space only influences the dimensionality of the input linearly, while still being able to capture radial distance changes with continuous resolution instead of discretized grid cells. In addition, the observability of angular position changes of surrounding static objects becomes more precise the closer they are to the other road user.

In a preferred embodiment of the invention, the generator unit is configured to determine the future trajectory of the other road user considering at least one dynamic object in the environment of the other road user.

To generate novel, accurate and safe future trajectories, the location coordinates of the road users is not enough. The location coordinates alone do not give any information regarding interactions with the directionality of movement of other road users in the scene. It would be impossible for any model to avoid collisions with dynamic elements without providing such road user information to the system.

In a preferred embodiment of the invention, the generator unit comprises an encoder unit, with said encoder unit configured to map an observed trajectory of the other road user to a common embedding space.

The purpose of the encoder unit is to aggregate the current state of other road users. In particular, the encoder unit embeds the past coordinates from other road users jointly on to a fixed length vector.

This common embedding space can be interpreted as a hidden layer of an artificial neural network.

In a preferred embodiment of the invention, the encoder unit comprises a long short-term memory unit.

Long short-term memory units are units of an artificial neural network.

The artificial neural networks are computing systems vaguely inspired by the biological neural networks that constitute animal brains. Such systems "learn" to perform tasks by considering examples, generally without being programmed with any task-specific rules. For example, in image recognition, they might learn to identify images that contain cats by analyzing example images that have been manually labeled as "cat" or "no cat" and using the results to identify cats in other images. They do this without any prior knowledge about cats, e.g., that they have fur, tails, whiskers and cat-like faces. Instead, they automatically generate identifying characteristics from the learning material that they process.

An artificial neural network is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common artificial neural network implementations, the signal at a connection between artificial neurons is a real number, and the output of each artificial neuron is computed by some non-linear function of the sum of its inputs. The connections between artificial neurons are called "synapses". Artificial neurons and synapses typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

The original goal of the artificial neural network approach was to solve problems in the same way that a human brain would. However, over time, attention moved to performing specific tasks, leading to deviations from biology. Artificial neural networks have been used on a variety of tasks, including computer vision, speech recognition, machine translation, social network filtering, playing board and video games and medical diagnosis.

A common long short-term memory unit is composed of a cell, an input gate, an output gate and a forget gate. The cell remembers values over arbitrary time intervals and the three gates regulate the flow of information into and out of the cell. Even though some variations of the long short-term memory unit do not have one or more of these gates or maybe have other gates.

Intuitively, the cell is responsible for keeping track of the dependencies between the elements in the input sequence. The input gate controls the extent to which a new value flows into the cell, the forget gate controls the extent to which a value remains in the cell and the output gate controls the extent to which the value in the cell is used to compute the output activation of the LSTM unit.

There are connections into and out of the long short-term memory gates, a few of which are recurrent. The weights of these connections, which need to be learned during training, determine how the gates operate.

In a preferred embodiment of the invention, the generator unit comprises a decoder unit, with said decoder unit configured to determine the future trajectory of the other road user considering the common embedding space.

In a preferred embodiment of the invention, the decoder unit comprises a long short-term memory unit.

A preferred embodiment of the invention is a generator unit trained by the system according to the invention.

A second aspect of the invention describes a computer implemented method for training a generator unit and a discriminator unit simultaneously, with said generator unit configured to determine a future trajectory of at least one other road user in the environment of a vehicle user considering an observed trajectory of the at least one other road user, with said discriminator unit configured to determine whether the determined future trajectory of the other road user is an actual future trajectory of the other road user, and with the method comprising the step of training said generator unit and said discriminator unit simultaneously with gradient descent.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
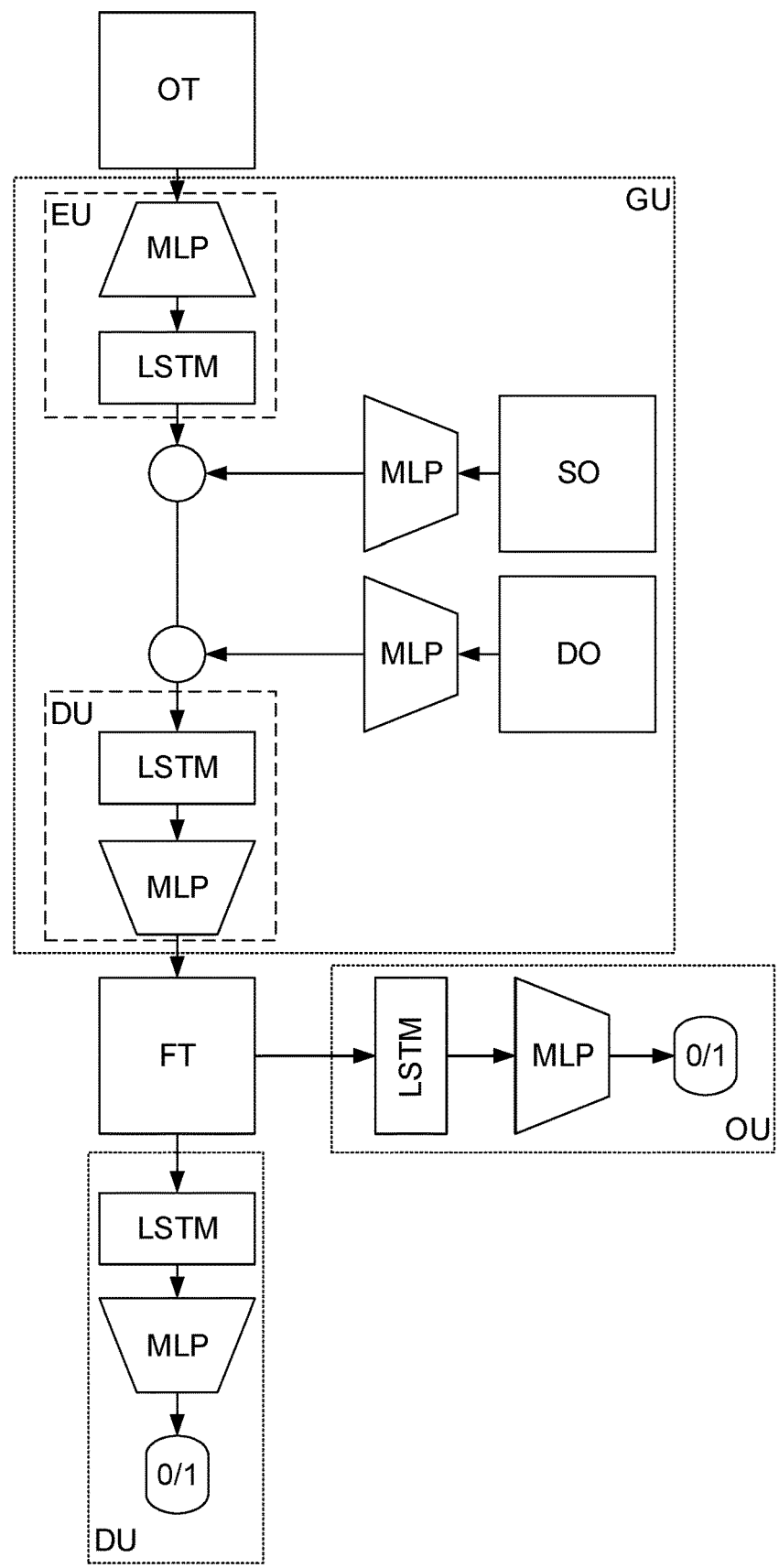
FIG. 1 shows an exemplified structure of the system for training the artificial intelligence unit.

FIG. 1 shows a system for training a generator unit GU and a discriminator unit DU simultaneously. Said generator unit GU is configured to determine a future trajectory FT of at least one other road in the environment of a vehicle considering an observed trajectory OT of the at least one other road user. The other road user is in particular a vulnerable road user, e.g. a pedestrian, a cyclist or an animal.

The generator unit GU is in particular configured to determine the future trajectory FT of the at least one other road user considering at least one static object SO in the environment of the other road user, particular considering the relative location of the at least one static object SO.

Moreover, the generator GU unit is in particular configured to determine the future trajectory FT of the other road user considering at least one dynamic object DO in the environment of the other road user.

The generator unit GU comprises in particular an encoder unit EU, with said encoder unit EU configured to map an observed trajectory OT of the other road user to a common embedding space. The encoder unit EU comprises in particular a long short-term memory unit LSTM.

The generator unit GU comprises in particular a decoder unit DU, with said decoder unit DU configured to determine the future trajectory FT of the other road user considering the common embedding space. The decoder unit DU comprises in particular a long short-term memory unit LSTM.

The discriminator unit DU is configured to determine whether the determined future trajectory FT of the other road user is an actual future trajectory of the other road user.

The system comprises in particular an oracle unit OU, with said oracle unit OU configured to determine a reward for the determined future trajectory FT of the at least one other road user considering whether the determined future trajectory FT of the other road user is collision-free.

The system is configured to train the generator unit GU and the discriminator DU unit simultaneously with gradient descent, where said system is in particular configured to train the generator unit GU considering the reward determined by the oracle unit OU.

Figure 2:
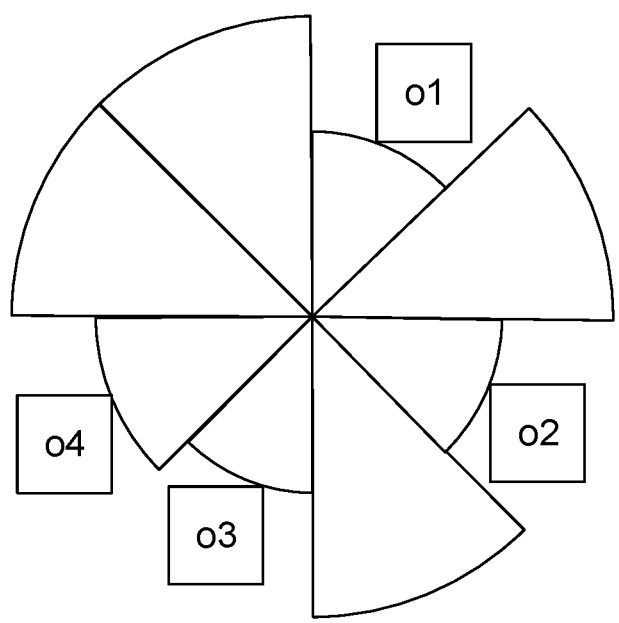
FIG. 2 shows an exemplified grid in polar angle space.

FIG. 2 shows an exemplified grid in polar angle space. The grid in polar angle space is in particular centered at an other road user for which a future trajectory will be determined by the generator unit GU and aligned with the heading of the other road user. The encoded value per grid cell is in particular the minimum distance to the (static or dynamic) objects o1, o2, o3, o4 that lie within the cone of the angular grid cell.

Compared to a standard 2D grid, the resolution of the grid in polar angle space only influences the dimensionality of the input linearly, while still being able to capture radial distance changes with continuous resolution instead of discretized grid cells. In addition, the observability of angular position changes of surrounding pedestrians becomes more precise the closer they are to the query agent.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
   an artificial neural network comprising a generator unit, a discriminator unit, and an oracle unit,
   wherein said generator unit, said discriminator unit, and said oracle unit are executed by a computer,
   wherein said generator unit is configured to determine a future trajectory of at least one other road user in an environment of a vehicle considering an observed trajectory of the at least one other road user,
   wherein said discriminator unit is configured to determine whether the determined future trajectory of the at least one other road user is an actual future trajectory of the at least one other road user, and
   wherein said computer is configured to train said generator unit and said discriminator unit simultaneously with gradient descent,
   wherein said oracle unit is configured to determine a reward for the determined future trajectory of the at least one other road user considering whether the determined future trajectory of the other road user is collision-free, and
   wherein said computer is configured to train said generator unit considering the reward determined by the oracle unit.

2. The system according to claim 1, wherein the other road user is a vulnerable road user.

3. The system according to claim 1, wherein
   the generator unit is configured to determine the future trajectory of the at least one other road user considering at least one static object in the environment of the other road user.

4. The system according to claim 3, wherein
   the generator unit is configured to determine the future trajectory of the other road user considering the relative location of the at least one static object.

5. The system according to claim 3, wherein
   the generator unit is configured to determine the future trajectory of the other road user considering at least one dynamic object in the environment of the other road user.

6. The system according to claim 1, wherein
   the generator unit comprises an encoder unit, with said encoder unit configured to map an observed trajectory of the other road user to a common embedding space.

7. The system according to claim 6, wherein
   the encoder unit comprises a long short-term memory unit.

8. The system according to claim 6, wherein
   the generator unit comprises a decoder unit, with said decoder unit configured to determine the future trajectory of the other road user considering the common embedding space.

9. The system according to claim 8, wherein
   the decoder unit comprises a long short-term memory unit.

10. A generator unit trained by the system according to claim 1.

11. A computer implemented method for training a generator unit and a discriminator unit of an artificial neural network, wherein
   said generator unit is configured to determine a future trajectory of at least one other road user in the environment of a vehicle user considering an observed trajectory of the at least one other road user,
   said discriminator unit is configured to determine whether the determined future trajectory of the other road user is an actual future trajectory of the other road user,
   said artificial neural network includes an oracle unit that is configured to determine a reward for the determined future trajectory of the at least one other road user considering whether the determined future trajectory of the other road user is collision-free, and
   said generator unit, said discriminator unit, and said oracle unit are executed by a computer,
   the method comprising the step of:
   training, by the computer, said generator unit and said discriminator unit, wherein
   said training is carried out simultaneously with gradient descent, and
   said training considers the reward determined by the oracle unit.

\* \* \* \* \*